US009716752B2

(12) United States Patent
Li (10) Patent No.: US 9,716,752 B2
(45) Date of Patent: Jul. 25, 2017

(54) METHOD AND APPARATUS FOR DATA EXCHANGE BASED ON USER STATUS (71) Applicant: Alibaba Group Holding Limited, Grand Cayman (KY)

(72) Inventor: Qingfeng Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 223 days.

(21) Appl. No.: 14/529,047

(22) Filed: Oct. 30, 2014

(65) Prior Publication Data

US 2015/0120871 A1   Apr. 30, 2015

(30) Foreign Application Priority Data

Oct. 31, 2013  (CN) .......................... 2013 1 0533683

(51) Int. Cl.
*H04L 29/08* (2006.01)
*H04W 4/02* (2009.01)

(52) U.S. Cl.
CPC .......... *H04L 67/1095* (2013.01); *H04L 67/18* (2013.01); *H04L 67/22* (2013.01); *H04L 67/306* (2013.01); *H04L 67/325* (2013.01); *H04W 4/023* (2013.01); *H04L 67/24* (2013.01)

(58) Field of Classification Search
None
See application file for complete search history.

(56) References Cited

U.S. PATENT DOCUMENTS

| 9,160,786 | B1* | 10/2015 | Jackson | H04L 67/06 |
|---|---|---|---|---|
| 9,191,504 | B2* | 11/2015 | Campbell | H04L 51/04 |
| 2004/0111360 | A1 | 6/2004 | Albanese | |
| 2005/0080843 | A1 | 4/2005 | Cabrera et al. | |
| 2006/0114920 | A1* | 6/2006 | Jung | H04L 67/36 370/410 |
| 2007/0294397 | A1* | 12/2007 | Kunz | H04L 12/581 709/224 |
| 2008/0022329 | A1 | 1/2008 | Glad | |
| 2009/0201896 | A1* | 8/2009 | Davis | H04W 84/18 370/338 |
| 2010/0027426 | A1* | 2/2010 | Nair | H04W 28/16 370/238 |
| 2012/0094697 | A1 | 4/2012 | Conner et al. | |

(Continued)

OTHER PUBLICATIONS

PCT Search Report and Written Opinion mailed Jan. 30, 2015 for PCT Application No. PCT/US14/63255, 9 Pages.

*Primary Examiner* — Thomas Dailey
(74) *Attorney, Agent, or Firm* — Lee & Hayes, PLLC (57) ABSTRACT A method and an apparatus for data exchange. The method identifies a first user located within a predefined boundary of a second user according to the location information of two users, and updates the basic statuses of the two users according to their behavior records. The method then determines whether a delayed type of a data exchange request requesting a data exchange between the users is preferred, according to the basic status of the first user and/or the second user. Upon receiving the data exchange request, the server executes the data exchange after a delay permitted by the data exchange request. The method determines the delayed type to be preferred if the basic status of one of the users is in a busy state.

20 Claims, 3 Drawing Sheets (56) References Cited

U.S. PATENT DOCUMENTS

| | | | |
|---|---|---|---|
| 2013/0138745 A1* | 5/2013 | Tardelli | H04L 67/322 709/206 |
| 2013/0150089 A1 | 6/2013 | Kuwahara et al. | |
| 2013/0166658 A1* | 6/2013 | Yin | H04L 12/581 709/206 |
| 2014/0180983 A1* | 6/2014 | Deng | G06N 3/02 706/15 |

* cited by examiner

METHOD AND APPARATUS FOR DATA EXCHANGE BASED ON USER STATUS

RELATED PATENT APPLICATIONS

This application claims foreign priority to Chinese Patent Application No. 201310533683.2 filed on Oct. 31, 2013, entitled "METHOD AND APPARATUS FOR DATA EXCHANGE", Chinese Patent Application is hereby incorporated by reference in its entirety.

TECHNICAL FIELD

The present application relates to data processing, and more particularly to systems and apparatuses for data exchanges.

BACKGROUND

In conventional data exchange methods, a user may initiate a data exchange request with another user through a server, which generates a data exchange instruction in real time based on the data exchange request, and issues the instruction to the two users who need to perform data exchange. Upon receiving the instructions from the server, the two users complete the data exchange operation according to the server instructions.

However, during a data exchange, the two exchanging parties (i.e., the user who initiates the data exchange request, and the user who receives the exchange request) have no way to predict the amount of data exchange that currently needs to be carried out by the two parties at the requested time. For example, in a home or hotel environment, due to fewer numbers of users of the data exchange service and better network conditions, the processing speed of a data exchange is faster, and as a result, the amount of data pending to be exchanged is smaller. In office buildings and shopping malls, however, due to a larger number of users and busy network conditions, the processing speed of a data exchange is slower, and therefore the amount of data pending to be exchanged is greater. When one of the parties, especially the user that receives a data exchange request, has a large amount of data exchange pending to be processed, the party may be unable to timely execute the data exchange instructions received from the server, and thus unable to promptly carry out the data exchange operation, resulting in an overload of data exchange on the user. Sometimes, the data exchange may be terminated with a failure due to a non-executed data exchange instruction that has expired.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

This disclosure provides a method and an apparatus for data exchange, in order to solve the problem of data exchange failures due to unknown data exchange amount, and to improve the success rate of data exchange.

In order to solve the above technical problems, this disclosure provides the following technical solutions:

One aspect of the disclosure is a method that determines a first user located within a predefined boundary of a second user according to location information of two users, and updates the basic statuses of the two users according to their behavior records. The method then determines a type of a data exchange request requesting a data exchange between the users according to the basic status of the first user and/or the second user. Upon receiving the data exchange request, the server executes the data exchange according to the determined type of the data exchange request.

The location information of the first user and the second user may include geographic location information of the first user and the second user. In order to identify the first user located within the predefined boundary of the second user, the method compares the geographic location information of the first user and the geographic location information of the second user, and identifies the first user located within a predefined geographic area of the second user.

In an embodiment, the data exchange request is determined to be a delayed type if the basic status of the first user and/or the second user is the busy state.

The behavior records of the first user or the second user may include a historical behavior record and/or an amount of current data exchange, and the historical behavior record may include historical amounts of past data exchanges. The basic status of the first user or the second user may be in a busy state or an idle state, and the method updates the basic status of the first user and/or the second user to the busy state if the historical behavior record of the first user and/or the second user indicates a historical amount of data exchanges during a time period matching a current time above a predefined threshold; or the method updates the basic status of the first user and/or the second user to the idle state if the historical behavior record of the first user and/or the second user indicates a historical amount of data exchanges during the time period matching the current time at or below the predefined threshold.

The predefined threshold may be determined by taking into consideration of a location scenario indicated in the location information and/or a network condition according to the location scenario.

In another embodiment, the method updates the basic status of the first user and/or the second user to the busy state if the amount of current data exchanges of the first user and/or the second user is above a predefined threshold; or the method updates the basic status of the first user and/or the second user to the idle state if the amount of current data exchange of the first user and/or the second user is at or below the predefined threshold.

In an embodiment, to update the first user's basic status and the second user's basic status, the method pushes the basic status of the first user to the first user and the second user, and pushes the basic status of the second user to the second user and the first user.

In an embodiment, the method selects, by a server in communication with the first user and/or the second user, a delayed type of the data exchange request, when the basic status of the first user and/or the second user is in a busy state. Alternatively, the method allows, by a server in communication with the first user and/or the second user, the first user and/or the second user to select a delayed type of the data exchange request, when the basic status of the first user and/or the second user is in a busy state. Alternatively, the method requests, by a server in communication with the first user and/or the second user, the first user and/or the second user to accept a delayed type of the data exchange request when the basic status of the first user and/or the basic status of the second user is in a busy state.

Accordingly, the method uses the server in communication with the first user and/or the second user to receive from the first user and/or the second user a delayed type of the data exchange request when the basic status of the first user and/or the second user is in a busy state.

The server executes the data exchange between the first user and the second user after a delay permitted by the second user if the data exchange request received is a delayed type; and alternatively executes the data exchange between the first user and the second user immediately if the data exchange request received is an instant type.

The method may also use the server to execute the data exchange between the first user and the second user according to the first user's specific information including a basic data used by the first user in the data exchange.

Another aspect of the disclosure is a method that identifies a first user located within a predefined boundary of a second user according to location information of two users, and updates the basic statuses of the two users according to their behavior records. The method then determines whether a delayed type of a data exchange request requesting a data exchange between the users is preferred, according to the basic status of the first user and/or the second user. Upon receiving the data exchange request, the server executes the data exchange after a delay permitted in the data exchange request. The method determines the delayed type to be preferred if the basic status of one of the users is in a busy state. In one embodiment, the method determines the delayed type to be preferred if the basic status of the first user's basic status and/or the second user is determined to be in a busy state.

Yet another aspect of the disclosure is a computer-based apparatus for user feature extraction based on user behavior. The apparatus has a computer having a processor, computer-readable memory and storage medium, and I/O devices. The computer is programmed to have functional modules including:

a user location identification module for identifying a first user located within a predefined boundary of a second user, according to location information of the first user and the second user;

a status updating module for updating the first user's basic status and the second user's basic status, according to the first user's behavior records and the second user's behavior records, respectively;

a data exchange type determination module for determining a type of a data exchange request requesting a data exchange between the first user and the second user, according to the basic status of the first user and/or the second user;

a request receiving module for receiving, from the first user or the second user, the data exchange request; and an execution module for executing the data exchange between the first user and the second user according to the type of the data exchange request.

In an embodiment, the data exchange type determination module determines whether a delayed type of a data exchange request requesting a data exchange between the first user and the second user is preferred, according to the basic status of the first user and/or the second user; and the execution module executes the data exchange between the first user and the second user after a delay permitted in the data exchange request.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

The present disclosure is described in further detail in conjunction with accompanying figures and example embodiments. In the description, the term "technique(s)," for instance, may refer to a method, an apparatus device, a system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Unless it would cause a conflict, the examples and embodiments described in the present disclosure, and the characteristics and features thereof, may be combined freely. Further, not every step described in the embodiments is required in order to practice the techniques of this disclosure.

This disclosure utilizes the location information of the users involved in a data exchange. In this description, "user" generally refers to a device or machine such as a mobile device or a computer used for a certain user application purpose. In the following description of the exemplary embodiments, a first user generally refers to a user that needs to access a certain service or application, while a second user generally refers to a user that provides or hosts the service or the application.

Starting with the second user as a criterion, a system employing the disclosed method determines one or more first users that are located within a predefined boundary of the second user. Such first user(s) are referred to as related first user(s). Each user is given a basic status in the context of the system. The basic status of the first user is kept updated according to behavior records of the first user, while the basic status of the second user is kept updated according to behavior records of the second user. The system may predict the amount of current data exchanges that need to be processed, based on the behavior records of each user. If it is determined that the amount of current data exchanges needing to be processed is at a high level for the first user and/or the second user, the system updates the basic status of the respective user to be a busy state. The second user then permits a delay in executing the data exchange between the first user and the second user. The data exchange is executed after the delay. If it is determined that the amount of current data exchange needing to be processed is at a relatively low level for the first user and the second user, the basic status of the respective user remains (or is updated) to be an idle state. The system executes the data exchange instructions between the first user and the second user immediately. The procedure is described with reference to blocks S110-S140 of FIG. 1.

Using the disclosed method and system, the basic status of the first user and/or the second user is obtained, and used as a basis to decide how the data exchange is performed (whether immediately or delayed). This avoids a situation where a large number of first users requesting data exchange with the second user at the same time to cause data exchange failure. The disclosed method and system therefore helps to increase the success rate of data exchange and improve the user experience.

Figure 1:
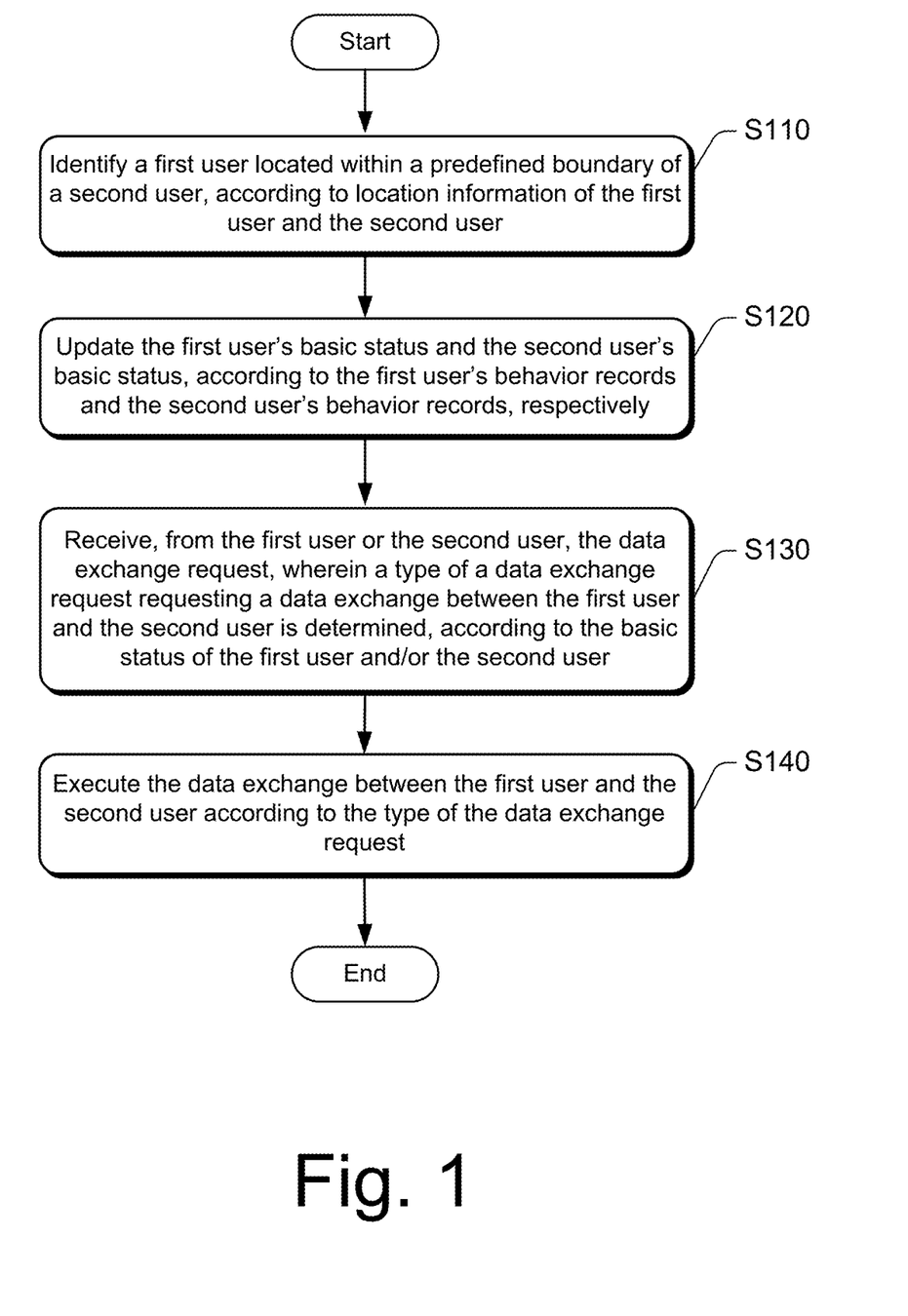
FIG. 1 is a block flow diagram of a disclosed method for data exchange.

FIG. 1 is a block flow diagram of an embodiment of the method for data exchange. The illustrative embodiment includes the following acts described in blocks.

Block 110 identifies a first user located within a predefined boundary of a second user, according to location information of the first user and the second user.

Figure 2:
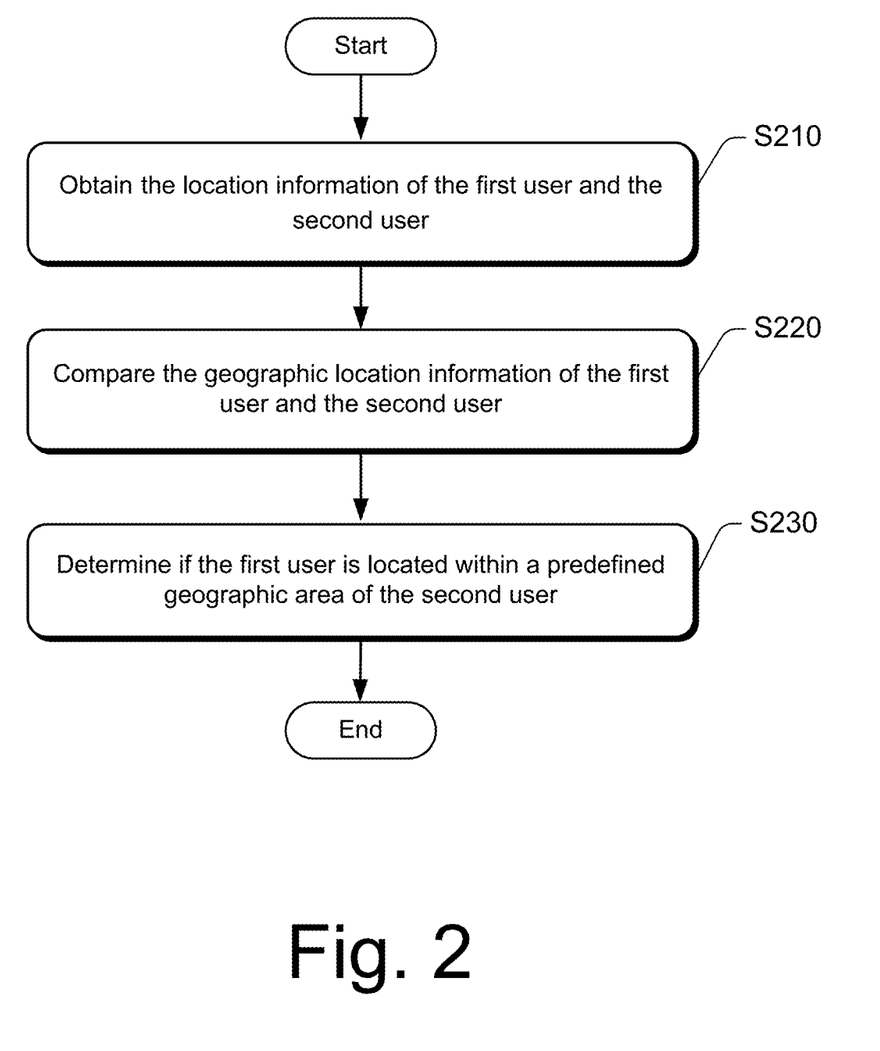
FIG. 2 is an illustrative block flow diagram of the expanded block S110 of FIG. 1.

This process of identification is further illustrated in FIG. 2 which is a more detailed flow diagram of an embodiment of the process for block S110 in FIG. 1.

Specifically, block S210 obtains the location information of the first user and the second user. The location information of the first user may include geographic location information of the first user; the location information of the second user may include geographic location information of the second user.

The first user and the second user may be a user terminal such as a mobile phone, a tablet computer, etc., and may each logon to an application program for data exchange on the user terminal.

The first user and the second user may report, through the data exchange application program, their respective geographic location information to a server. The geographic location information may be GPS (Global Positioning System) information, and the first user and the second user may report the GPS information to the server periodically at predefined time intervals.

More specifically, as the first user and the second user logon to the data exchange application, the application may use a timed routine scheduled to periodically trigger the GPS equipment in the user terminal of the first user and that in the second user, and use the GPS equipment to obtain the geographic location information of the first user and the second user. Accordingly, the first user and the second user periodically report to the server the geographic information obtained by the GPS equipment.

In an exemplary scenario where the first user is a customer requesting service, the location information of the first user changes frequently, and therefore the first user may report its geographic location information to the server more frequently, for example once every five minutes. The location information of the second user (which may be a service provider as in the exemplary scenario) changes relatively infrequently, and therefore the second user may report its geographic location information to the server less frequently, for example once every month.

The server periodically obtains the geographic location information of the first user and the second user, stores such information, updates the old geographic location information of the first user and the second user using the respective new geographic location information. The stored geographic location information becomes the updated geographic location information of each user.

In an embodiment, the first user or the second user sends a logon request to the server to logon the data exchange application program. The logon request carries the IP address of the first user or the second user. The server records the IP address, and uses the IP address to search the IP address library and obtain the geographic location information of the user based on the matching relationship between the IP address and the geographic location. The geographic location information corresponding to the IP address is recorded previously.

Block S220 compares the geographic location information of the first user with the geographic location information of the second user.

When multiple first users exist, the server compares the geographic location information of each first user against the geographic location information of the second user in the geographic location information stored in the library.

Block S230 determines one or more related first users that are located within the predefined geographic area of the second user.

The predefined geographic area of the second user is a preset boundary. For example, take the second user's location as the center, a circle of a certain radius (e.g., 500 meters) may be drawn to represent the predefined geographic area. Alternatively, the second user may be a business such as a restaurant, and its predefined geographic area may be defined by the perimeters of the physical premises.

By comparing the geographic location information of the first user and the second user, the server computes the first users that are within the predefined geographic area of the second user. For example, if the server has computed that a certain first user's location is within the predefined circle of a 500 m radius centered on the second user, it may conclude that the particular first user is located within the predefined geographic area of the second user. Performing the same computation with all available first users determines one or more related first users in relation to the second user.

Similarly, a geographic area may also be predefined for the first user, and accordingly the server may compute one or more related second users that are located within the predefined geographic area of the first user.

Referring back to FIG. 1, block S120 updates the first user's basic status and the second user's basic status, according to the first user's behavior records and the second user's behavior records, respectively.

The behavior records may include historical behavior records and the amount of the current data exchanges that need to be performed. Each user may have its own historical behavior records, and such records may specify the past data exchange statistics of the involved parties (e.g., data exchanges occurred in the past between a particular first user and a particular second user). The historical behavior records may contain records stored on the server indicating the amount of data exchanges between the first user and the second user during historical time periods that match the current time of the current data exchange request. Broadly, time periods may refer to a certain period of time during the day. For example, the period of 3 PM-4 PM on Oct. 7, 2013 and the period of 3 PM-4 PM on Oct. 8, 2013 may be considered to be matching time periods, or the same historical time period of the day. The server computes the amount of data exchange between the first user and the second user during the current time period, based on the historical records of data exchanges between the first user and the second user in the same matching historical time period. For example, if the server has computed the average number of data exchanges occurred between the second user and all related first users during 3 PM-4 PM to be 10 exchanges per day, based on the historical records during Oct. 1-Oct. 7, 2013, the server may predict that during 3 PM-4 PM on Oct. 8, 2013, the second user may need to process about 10 data exchanges with related first users as well.

The amount of the current data exchanges may include the amount of current data exchanges of the related first users and the amount of current data exchanges of the second user. The amount of current data exchanges is the amount of data exchanges that need to be performed on the server during the current time period, between the related first users and/or the related second user.

The basic status of the related first user or the second user may be any of the following: busy, idle, and off-line.

A busy state of a user may be defined as one when the amount of data exchanges involving the related first users and/or the second user is above a preset threshold, which may be set variably and empirically according to the actual application scenario. The general criteria for setting such an empirical threshold is that when the amount of data exchanges is above the empirical threshold, there are likely difficulties in performing operations required in data exchanges for the involved users (the related first users or the second user). The operations required by data exchanges may be user clicking of the button related to a data exchange, for example a button for generating an order, a "pay now" button, or any subsequent operations that need to be performed in the data exchange. If these operations cannot be timely processed, the data exchange is likely to fail.

Usually, a busy status of the first user or the second user may indicate a peak time of the day for data exchanges involving the particular first user or the second user.

An idle state of a user may be defined as one when the amount of data exchanges involving the related first users and/or the second user is at or below a preset threshold. The idle state indicates that, under normal conditions of processing the current pending data exchanges, there is still room to increase the amount of data exchange to be normally executed, until the amount of data exchange reaches the preset threshold.

An off-line state is a condition when the user (the related first user or the second user) is not logged in the application to perform data exchanges with other users.

The basic status of the first user and/or the basic status of the second user may be predicted using the historical behavior records of the respective user. If the historical behavior records of the related first user and/or the second user indicate that the amount of data exchange in the same (matching) historical time periods exceeds the preset threshold, the basic status of the respective user may be updated to a busy state; if the historical behavior records of the related first user and/or the second user indicate that the amount of data exchange in the same (matching) historical time periods is at or below the preset threshold, the basic status of the respective user may be updated to an idle state.

For example, the second user is a merchant whose historical records indicate that during Oct. 1-Oct. 7, 2013, the average number of transactions (the amount of data exchanges) during 3 PM-4 PM each day is 15 transactions. If the preset threshold for evaluating the basic status of the user is 10 transactions, the historical amount of data exchanges is above the preset threshold, and therefore the basic status of this second user is in a busy state. That is, according to the historical records of the past data exchanges, it is predicted that the number of data exchange transactions in the same time period of October 8 is likely to be around 15 transactions as well, which is above the preset threshold of 10 transactions, and therefore the second user is regarded to be in a busy state.

In another example, the backend of the server schedules a repeated timed task, which starts at 12 o'clock every night to compute an average amount of data exchanges (i.e., an average number of transactions) for each hour period on each day or for other periods of each day, and a daily average amount of data exchange, for each user (the first user and the second user). For example, if the daily average number of transactions for a certain user is 12 transactions, and the hourly average number of transactions is one ("1") transaction, this hourly average of one transaction may be taken as the predefined threshold for each hourly period. The historical transaction records of the user in the past year are taken to compute the normal distribution of the transactions over the 24 hour time period of each day. If the results show that the transactions during the 24 hours of each day are mostly concentrated during 9-10 o'clock AM and 20-21 o'clock PM, during which period of time the number of transactions are above the threshold of one transactions per hour, it may be predicted that the user would be in a busy state on the same time period of the current day. For example, if the current time is 9:30 AM, which falls in the transaction peak hour of between 9-10 AM, the basic status of the user may be updated to the busy state.

The basic status of the first user and/or the second user may be alternatively or additionally computed using the amount of current data exchanges of the first user and/or the second user that need to be performed. As the amount of current data exchanges exceeds the preset threshold, the basic status of the first user and/or the second user may be updated to the busy state. If the amount of current data exchanges is at or below the preset threshold, the basic status of the first user and/or the second user may be allowed to remain in (or updated to) the idle state.

For example, the second user is a merchant which has 8 current transactions pending to be processed. If the preset threshold is 10 transactions, the number of the current transactions is below the threshold (8<10), indicating that the basic status of the merchant is in an idle state, and the merchant still has capacity to process more transactions newly generated.

Furthermore, the preset threshold that is used for data exchange amount comparison may be either set according to the historical behavior records or empirically self-defined by the first user or the second user. For example, the threshold of merchant (the second user) may be set based on the merchant's historical transaction records (historical behavior records). If the peak value (the maximum) of the number of transactions that can be handled by the merchant per minute is 20 transactions, the threshold may be set to be that same number, 20. Alternatively, the threshold may be self-defined by the merchant in the application program (e.g., an App installed on a user terminal), based on the number of transactions (the amount of data exchanges) the merchant can handle. For example, if the merchant can process 10 transactions per minute, the merchant may set the threshold to be 10.

The above two methods may be used together in combination. For example, the user (the first user or the second user) self-defined threshold may be given a priority in choosing which threshold to be used, and the system may use a threshold computed based on the historical behavior records only when there is no self-defined threshold available. These two thresholds, the self-defined by the user and the system-defined based on the historical behavior records, may be different, but may also be the same.

In practice, the preset threshold may be set differently according to different location information of different application scenarios, and/or different network conditions of different application scenarios. That is, the preset threshold may vary according to different application scenarios and different network conditions. For example, the application scenario may be a shopping mall, a hotel, a home, a workplace, etc. Each of the location scenarios may also have a different data exchange processing capability in a different network condition. For example, if the network condition is fair, the user may be able to process five operations related to data exchange per minute. If the network condition is bad, the user may be able to process only one operation related to data exchange. Therefore, the condition of the network directly impacts the execution speed of the data exchanges. Accordingly, a greater threshold may be set in an application scenario that has better network conditions, or in a time period during which the network conditions are fair. Conversely, a smaller threshold may be set in an application scenario that has worse network conditions, or in a time period during which the network conditions are not good.

Furthermore, each application scenario has its own location information. For example the geographic location information of a shopping mall may indicate the geographic location of a checkout station, and the predefined boundaries of the shopping mall cover the geographical location area of the shopping mall. When the user's geographic location is within the geographic area of the shopping mall, the threshold set particularly for the shopping mall may be used to evaluate the basic status of the users.

Furthermore, the server may push the basic status of the related first user to the corresponding related first user and the second user, and also push the basic status of the second user to the second user and each related first user.

After the first user and the second user have logged in the application program for data exchange, the first user within the predefined boundaries of the second user may be able to see on its application program the basic status of the first user itself and the basic status of the second user. Likewise, the second user may be able to see on its own application program the basic status of the second user itself and the basic status of the first user (or the basic statuses of multiple first users within the predefined boundaries).

Block S130 receives from either the first user or the second user a request for data exchange between the first user and the second user.

The data exchange request may be of different types (e.g., an instant type or a delayed type). As described herein, the type of the data exchange request is determined according to the basic status of the first user and/or the second user.

The type of the data exchange request may be determined using a variety of suitable procedures. In one embodiment, a server in communication with the first user and/or the second user selects a delayed type of the data exchange request when the basic status of the first user and/or the second user is in a busy state. In another embodiment, a server in communication with the first user and/or the second user allows the first user and/or the second user to select a delayed type of the data exchange request when the basic status of the first user and/or the second user is in a busy state. A server in communication with the first user and/or the second user may also request the first user and/or the second user to accept a delayed type of the data exchange request when the basic status of the first user and/or the second user is in a busy state.

In other words, the request for data exchange between the first user and the second user is conditioned on the basic status of the first user and/or the second user.

The first user involved is located within the predefined boundaries of the second user, and needs to perform a data exchange with the second user.

The basic status of the first user and that of the second user are visible to each other. In other words, the first user can see the basic status of the second user, and likewise the second user can see the basic status of the first user. Furthermore, the first user and/or the second user submits a certain type of a request for data exchange according to the basic status of the first user and/or the basic status of the second user. The request is for performing a data exchange between the particular first user and the second user.

There may be different types of data exchange requests, for example an instant type and a delayed type. The instant type is used to request for immediate execution of the data exchange between the first user and the second user. The delayed type is used to request for a delayed execution of the data exchange. The length of the delay may be defined in the system or defined in the request itself Upon receiving an instant type request, the server generates a data exchange instructions, and issues the instructions to the first user and the second user involved in the data exchange. Upon receiving a delayed type request, the server may inquire the second user if the second user permits a delayed execution of the data exchange instructions. If the second user indicates a permit, the server notifies the first user the delay of the data exchange, and executes the data exchange instructions after the delay.

The length of the delay in time may be set variably according to the empirical data of various application scenarios. Alternatively, it may be set to be the time taken for the receiving party of the request (the first user or the second user) to change its basic status from busy to idle.

The type of the data exchange request may be either explicitly described in the request, or implicitly assumed. For example, during a payment process, if the user clicks on a "pay now" button, the request for payment may be regarded as an instant type of data exchange request. If the user clicks on "create an order" instead of the "pay now" button, it may be regarded as a delayed type of payment request.

The user who submits a delayed data exchange request may be assumed to have indicated an approval to the delay. For example, if the data exchange request is sent by the second user, the second user may be regarded to have already accepted the delayed execution of the data exchange.

In an embodiment, when the first user and/or the second user is in a busy state, the server may accept from the first user or the second user a delayed type of data exchange, as well as an instant type of data exchange request. When the server receives a delayed type data exchange request, and if the first user and/or the second user's basic status is in a busy state, the second user may permit the server to delay by a certain time period the execution of the data exchange between the first user and the second user. In these conditions, the first user and/or the second user are enabled to send a delayed data exchange request to delay the execution of the data exchange in order to avoid data traffic during rush hours.

When the first user and the second user are in an idle state, the server receives from the first user or the second user an instant type data exchange request, and at least does not suggest the delayed type. That is, if the first user and the second user both have processing capacity to spare, either user may submit an instant type data exchange request to have the data exchange executed immediately.

In an embodiment, before sending a request for data exchange, the first user and the second user may exchange with each other their ID's issued by the server. When logged in the data exchange application program, a user may check its own ID or the other user's ID. For example, a first user may check the user ID of every related second user that is located within the predefined boundary of the first user.

Likewise, a second user may check the user ID of every related first user that is located within the predefined boundary of the second user. When the first user or the second user needs to send a data exchange request to the server, the respective user may do so with a target at a particular related user ID.

For example, the second user is a merchant, and the first users are three customers including user A, user B and user C. The merchant ID is "111", the user A's ID is "001", the user B's ID is "002", while the user C's ID is "003". After the merchant, user A, user B and user C have all logged on to their payment application program (data exchange application), it may be determined that all three first users are located within the predefined boundary of the merchant. The merchant's application may show the user A's ID "001", the user B's ID "002", and the user C's ID "003". When user A needs to make a payment to the merchant, user A may inform the merchant of the user A's ID "001" to allow the merchant to search and find the ID "001" in the application, and send to the server a request for payment (data exchange request) specifically for user A with the ID "001".

Block S140 executes the data exchange between the first user and the second user according to the type of the data exchange request.

If the server receives a delayed type data exchange request, the server delays a time period permitted by the second user, and executes the data exchange between the first user and the second user after the delay.

If the server receives an instant type data exchange request, the server executes the data exchange between the first user and the second user immediately.

Specifically, the second user may be given authorization to allow the execution of a data exchange to be delayed by a delayed time. When the first user and/or the second user is in a busy state, the second user may issue, through the server, an instruction for a delayed execution of a data exchange. The server executes the data exchange between the first user and the second user after the delay time specified in the instruction. For example, when making a payment in a shopping mall, the first user is a customer, and the second user is a merchant. Suppose the merchant's basic status is in a busy state due to its large number of customers. Under such conditions, the merchant permits the customers to make a delayed payment. During the checkout process, either the customer or the merchant may initiate a request for a delayed payment (a delayed execution of data exchange). The server receives the request. If the request is from the customer, the server sends a popout notification to the merchant to inquire "do you permit delayed payment?" The merchant may click on a "Yes" button to indicate approval. If approved by the merchant, the server delays the payment-related data exchange between the customer and the merchant. If the request is from the merchant, the server may not need to inquire the merchant if a delayed payment as permitted, but instead may straightly delay the data exchange of the customer and the merchant (the payment).

More specifically, if at least one party of the data exchange transaction is in a busy state, a delayed payment may be determined to be advantageous or preferred, and therefore permitted, suggested, or even required. This happens when both the related first user and the second user are in a busy state, or the first user is in a busy state while the second user is in another state (e.g., idle state or off-line state), or the second user is in a busy state while the first user is in another state (e.g., idle or off-line). In any of these situations, because at least one of the first user and the second user may be unable to timely carry out the operations related to the data exchange, the requested data exchange might fail if attempted to be executed immediately. According to the present disclosure, however, the second user may use the authorization to delay the execution of the data exchange and allows the server to delay the time of the execution. This avoids situations where some of the data exchange request fail because new requests are piled up on a large number of existing requests when the second user is simultaneously conducting transactions with a large number of first users. This improves the success rate of data exchange.

For example, a customer (a first user) finishes a meal at a restaurant. The restaurant operator (a second user) initiates to the server a request for payment by the customer. If the basic status of the customer's device is in a busy state and thus cannot complete the payment immediately, the restaurant operator may request the server to create an order only. This indicates a request for a delayed payment by the restaurant, and also indicates a consent by the restaurant that only an order is being created. The server then creates the order for the customer and the restaurant, and notifies the customer and the restaurant that the payment has not been completed yet. After the delay, the server generates instructions for data exchange, and notifies the customer and the restaurant to complete the payment. The customer makes the payment to the restaurant according to the previously created order.

Alternatively, after the customer finishes the meal, the customer may initiate to the server a request for making a payment to the restaurant. If the customer notices that the restaurant's basic status is in a busy state and thus unable to complete the payment immediately, the customer may request the restaurant, through the server, to create an order only. This may be regarded as a request for a delayed payment. The server, upon receiving such a delayed payment request, inquires the restaurant if it is permissible to create an order only at the time. If the restaurant approves, the server creates an order for the customer and the restaurant, and notifies the customer and the restaurant that the payment has not been made. After the delay, the server generates instructions for data exchange, and notifies the customer and the restaurant to complete the payment. The customer makes the payment to the restaurant according to the previously created order.

When both the first user and the second user are in an idle state, both parties are able to execute the data exchange, and will not suffer data exchange failure caused by a larger number of pending data exchanges. In these conditions, the data exchange between the first user and the second user may be executed immediately.

In an embodiment, the server may execute the data exchange between the first user and the second user according to the data exchange request and certain specific information of the first user. Such specific information may be certain basic data of the first user used for data exchange. For example, a payment account's balance amount of the first user may be an example of such specific information. Without taking such user specific information into account, a request for a delayed payment could eventually fail due to insufficient funds (or due to other specific conditions).

Upon receiving a request for a delayed data exchange, the server determines if the specific information of the first user has a value within a valid range. If the value is outside the valid range, the server may reject the delayed data exchange. For example, the valid range of a payment account balance of the first user is set to be greater than 100 Yuan. If the balance is below 100 Yuan, the balance is regarded as being insufficient, and requires the first user to recharge the payment account before the payment (the data exchange) can be made. That is, the server receives a request for delayed payment and determines that the payment account balance of the first user has a value not within the valid range, the server may not allow the payment even if a delayed payment is requested, and notifies the users of the "insufficient payment account balance".

If the server receives a request for instant payment and determines that the payment account balance of the first user has a value not within the valid range, the server may also reject the payment and notifies the users of the "insufficient payment account balance."

The above-described techniques may be implemented with the help of one or more non-transitory computer-readable media containing computer-executable instructions. The non-transitory computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In connection to the method disclosed herein, the present disclosure also provides a computer-based apparatus for implementing the method described herein.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 3:
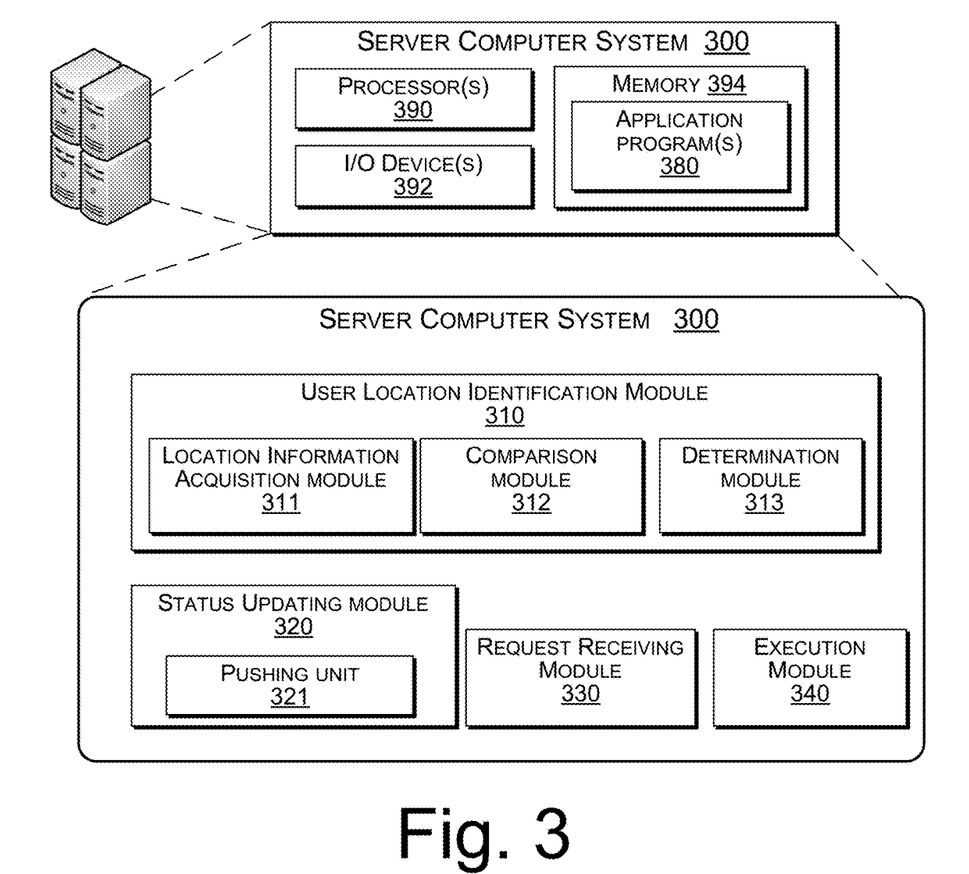
FIG. 3 is a block diagram of a system for data exchange.

FIG. 3 is a schematic diagram of the function blocks of a server system implementing the method for exchanging information in interactive communications.

Server computer system 300 can be based on a typical computer hardware which has one or more processor(s) 390, input/output (I/O) devices 392, memory 394 which stores application program(s) 380. Server computer system 300 is programmed to have the following functional modules.

A user location identification module 310 is configured for identifying a first user located within a predefined boundary of a second user, according to location information of the first user and the second user. The user location identification module 310 may include submodules such as location information acquisition module 311, comparison module 312, and determination module 313. The location information acquisition module 310 acquires the location information of the first user and the second user. The procedure of the acquisition is described in reference to block S210 in FIG. 2. The comparison module 312 compares the geographic location information of the first user and the geographic location information of the second user. The procedure of the comparison is described in reference to block S220 in FIG. 2. The determination module 313 is used to determine (identify) if the first user is located within the predefined geographic area of the first user. The process of the determination is described in reference to block S230 in FIG. 2.

A status updating module 320 is configured for updating the first user's basic status and the second user's basic status, according to the first user's behavior records and the second user's behavior records, respectively. The status updating module 320 may further include submodules pushing unit 321 for pushing the basic status of the first user and the second user to the first user and the second user, and for pushing the basic status of the second user to the second user and the first user. The procedure of the status updating is described in reference to block S120 in FIG. 1.

A data exchange type determination module (not shown) configured for determining a type of a data exchange request requesting a data exchange between the first user and the second user, according to the basic status of the first user and/or the second user, may also be used. Alternatively, the determination may be made by, or used in conjunction with, a module deployed at the first user and/or the second user.

A request receiving module 330 is configured for receiving, from the first user or the second user, the data exchange request. The procedure of receiving a request is described in reference to S130 in FIG. 1.

An execution module 340 is configured for executing the data exchange between the first user and the second user according to the type of the data exchange request. The procedure of executing a data exchange is described in reference to S140 in FIG. 1.

The above embodiments of the apparatus are closely related to the embodiments of the method described herein, and therefore the detailed description of the embodiments of the method is also applicable to the embodiments of the apparatus and is not repeated.

The technique described in the present disclosure may be implemented in a general computing equipment or environment or a specialized computing equipment or environment, including but not limited to personal computers, server computers, hand-held devices or portable devices, tablet devices, multiprocessor systems, microprocessor-based systems, set-top boxes, programmable consumer devices, network PCs, microcomputers and large-scale mainframe computers, or any distributed environment including one or more of the above examples.

In a typical configuration, a computing device includes one or more processors (CPU), input/output interfaces, network interfaces, and memory.

The memory may include a computer-readable medium such as a volatile memory, random access memory (RAM) and/or other forms of nonvolatile memory, such as read only memory (ROM) or flash memory (flash RAM). The internal memory of a computing device is a type of computer-readable memory medium.

The computer-readable media include permanent and non-permanent, removable and non-removable media, and may be formed in any method or technology for storage of information. Information stored may be a set of computer-readable instructions, data structures, program modules or other data. Examples of the computer storage media include, but are not limited to, phase-change memory (PRAM), a static random access memory (SRAM), dynamic random access memory (DRAM), other types of random access memory (RAM), read-only memory (ROM), electrically erasable programmable read-only memory (EEPROM), flash memory or other memory technology, CD-ROM read-only memory (CD-ROM), digital versatile disc (DVD) or other optical storages, magnetic cassettes, magnetic tape disk storage or other magnetic storage devices, or any other non-transmission medium that may be used to store information accessible by a computing device. According to definitions of the present disclosure, computer-readable media do not include temporary computer readable media (transitory media), such as a modulated data signal and a carrier wave.

The modules in particular may be implemented using computer program modules based on machine executable commands and codes. Generally, a computer program module may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, program modules may be located in either local or remote computer storage media including memory devices.

Various embodiments of the present specification are described progressively increased details with examples and environments. Each embodiment may focus a certain aspect of the disclosure, and therefore different embodiments may differ from one another, but may also share similar parts.

Methods and apparatus of information verification have been described in the present disclosure in detail above. Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method for data exchange, the method comprising:
   identifying a first user located within a predefined boundary of a second user, according to location information of the first user and the second user;
   updating a first user status and a second user status by:
      updating at least one of the first user status or the second user status to a busy state if a historical amount of past data exchanges associated with at least one of the first user or the second user is above a predefined historical threshold during a time period matching a current time; or
      updating at least one of the first user status or the second user status to an idle state if the historical amount of past data exchanges is at or below the predefined historical threshold during the time period matching the current time;
   determining a type of a data exchange request requesting a data exchange between the first user and the second user, according to at least one of the first user status or the second user status;
   receiving, from the first user or the second user, the data exchange request; and
   executing the data exchange between the first user and the second user according to the type of the data exchange request.

2. The method recited in claim 1, wherein the location information of the first user and the second user includes geographic location information of the first user and the second user, and the identifying the first user located within the predefined boundary of the second user comprises:
   comparing the geographic location information of the first user and the geographic location information of the second user; and
   identifying the first user located within a predefined geographic area of the second user.

3. The method recited in claim 1, wherein the data exchange request is determined to be a delayed type if at least one of the first user status or the second user status is the busy state.

4. The method recited in claim 3, wherein the delayed type of the data exchange request has a preset delay time defined by a server system or self-defined by at least one of the first user or the second user.

5. The method recited in claim 1, wherein the predefined historical threshold is determined by taking into consideration at least one of:
   a location scenario indicated in the location information, or
   a network condition according to the location scenario.

6. The method recited in claim 1, wherein the updating the first user status and the second user status further comprises:
   updating at least one of the first user status or the second user status to the busy state if an amount of current data exchange of at least one of the first user or the second user is above a predefined current threshold; or
   updating at least one of the first user status or the second user status to the idle state if the amount of current data exchange of at least one of the first user or the second user is at or below the predefined current threshold.

7. The method recited in claim 1, wherein the updating the first user status and the second user status comprises:
   pushing the first user status to the first user and the second user; or
   pushing the second user status to the second user and the first user.

8. The method recited in claim 1, wherein the determining the type of the data exchange request comprises:
   selecting, by a server in communication with at least one of the first user or the second user, a delayed type of the data exchange request when at least one of the first user status or the second user status is in the busy state.

9. The method recited in claim 1, wherein the determining the type of the data exchange request comprises:
   allowing, by a server in communication with at least one of the first user or the second user, at least one of the first user or the second user to select a delayed type of the data exchange request when at least one of the first user status or the second user status is in the busy state.

10. The method recited in claim 1, wherein the determining the type of the data exchange request comprises:
   requesting, by a server in communication with at least one of the first user or the second user, at least one of the first user the second user to accept a delayed type of the data exchange request when at least one of the first user status the second user status is in the busy state.

11. The method recited in claim 1, wherein the receiving, from the first user or the second user, the data exchange request comprises:
   receiving, at a server in communication with at least one of the first user or the second user, from at least one of the first user or the second user a delayed type of the data exchange request when at least one of the first user status or the second user status is in the busy state.

12. The method recited in claim 1, wherein the executing the data exchange between the first user and the second user according to the type of the data exchange request comprises:
  executing the data exchange between the first user and the second user after a delay permitted by the second user if the data exchange request received is a delayed type; and
  executing the data exchange between the first user and the second user immediately if the data exchange request received is an instant type.

13. The method recited in claim 1, wherein the executing the data exchange between the first user and the second user according to the type of the data exchange request comprises:
  executing the data exchange between the first user and the second user according to specific information of the first user including a value used by the first user in the data exchange.

14. A method for data exchange, the method comprising:
  identifying a first user located within a predefined boundary of a second user, according to location information of the first user and the second user;
  updating a first user status and a second user status by:
    updating at least one of the first user status or the second user status to a busy state if a historical amount of past data exchanges associated with at least one of the first user or the second user is above a predefined historical threshold during a time period matching a current time; or
    updating at least one of the first user status or the second user status to an idle state if the historical amount of past data exchanges is at or below the predefined historical threshold during the time period matching the current time;
  determining whether a delayed type of a data exchange request requesting a data exchange between the first user and the second user is preferred, according to at least one of the first user status or the second user status;
  receiving, from the first user or the second user, the delayed data exchange request; and
  executing the data exchange between the first user and the second user after a delay permitted in the delayed data exchange request.

15. The method recited in claim 14, wherein the determining whether the delayed type of the data exchange request requesting the data exchange between the first user and the second user is preferred comprises:
  determining the delayed type to be preferred if at least one of the first user status or the second user status is determined to be in the busy state.

16. A computer-based apparatus for user feature extraction based on user behavior, the apparatus comprising:
  a computer having a processor, computer-readable memory and storage medium, and I/O devices, the computer being programmed to have functional modules including:
    a user location identification module for identifying a first user located within a predefined boundary of a second user, according to location information of the first user and the second user;
    a status updating module for updating a first user status and second user status by:
      updating at least one of the first user status or the second user status to a busy state if a historical amount of past data exchanges associated with at least one of the first user or the second user is above a predefined historical threshold during a time period matching a current time; or
      updating at least one of the first user status or the second user status to an idle state if the historical amount of past data exchanges is at or below the predefined historical threshold during the time period matching the current time;
    a data exchange type determination module for determining a type of a data exchange request requesting a data exchange between the first user and the second user, according to at least one of the first user status or the second user status;
    a request receiving module for receiving, from the first user or the second user, the data exchange request; and
    an execution module for executing the data exchange between the first user and the second user according to the type of the data exchange request.

17. The apparatus recited in claim 16, wherein the data exchange type determination module determines whether a delayed type of the data exchange request requesting the data exchange between the first user and the second user is preferred, according to at least one of the first user status or the second user status; and wherein the execution module executes the data exchange between the first user and the second user after a delay permitted by the data exchange request.

18. The apparatus recited in claim 16, wherein the data exchange type determination module determines the delayed type to be preferred if at least one of the first user status or the second user status is determined to be in the busy state.

19. The method recited in claim 15, wherein the delayed type of the data exchange request has a preset delay time defined by a server system or self-defined by at least one of the first user or the second user.

20. The method recited in claim 14, wherein the predefined historical threshold is determined by taking into consideration at least one of:
  a location scenario indicated in the location information, or
  a network condition according to the location scenario.

* * * * *